US012775725B2

(12) United States Patent
Montgomery et al.

(10) Patent No.: US 12,775,725 B2
(45) Date of Patent: Oct. 27, 2026

(54) SYSTEM AND METHOD FOR DETECTING AND PREVENTING ANOMALOUS BEHAVIOR OF NON-INTERACTIVE MACHINE TO MACHINE DATABASE ACCOUNTS

(71) Applicant: Disney Enterprises, Inc., Burbank, CA (US)

(72) Inventors: Jeremy Montgomery, Winter Garden, FL (US); Ralph Peterkin, Clermont, FL (US); Whitney E. Smith, Belle Isle, FL (US)

(73) Assignee: Disney Enterprises, Inc., Burbank, CA (US)

( * ) Notice: Subject to any disclaimer, the term of this patent is extended or adjusted under 35 U.S.C. 154(b) by 207 days.

(21) Appl. No.: 18/645,364

(22) Filed: Apr. 24, 2024

(65) Prior Publication Data

US 2025/0335614 A1 Oct. 30, 2025

(51) Int. Cl.
*G06F 21/62* (2013.01)
*G06F 21/12* (2013.01)

(52) U.S. Cl.
CPC ............ *G06F 21/62* (2013.01); *G06F 21/121* (2013.01)

(58) Field of Classification Search
CPC ......... G06F 21/62; G06F 21/121; G06F 21/12
See application file for complete search history.

(56) References Cited

U.S. PATENT DOCUMENTS 10,642,990 B2 * 5/2020 Pattabhiraman ........ G06F 16/26
10,984,113 B1 4/2021 Dhaliwal et al.
11,314,773 B2 * 4/2022 Dorne ................. G06F 16/2455
(Continued)

FOREIGN PATENT DOCUMENTS

CA 2588202 A1 * 5/2006 ............... G07C 9/37
CN 109491715 B 3/2019
(Continued)

OTHER PUBLICATIONS

"A Database Encryption Inquiry Processing Method And Secret Calculation Coprocessor"; Document ID: CN 118395482 A; Date Filed: Mar. 21, 2024; Inventor: Fan, Yu-xin et al. (Year: 2024).*
(Continued)

*Primary Examiner* — Jayesh M Jhaveri
(74) *Attorney, Agent, or Firm* — Foley & Lardner LLP

(57) ABSTRACT

A responding computing device may receive, from a querying computing device, a database query intended for the responding computing device. The querying computing device may generate and submit database queries autonomously as part of scheduled tasks. The responding computing device may determine one or more templates of database queries associated with the querying computing device. The responding computing device may perform a validation of the database query to determine whether the querying computing device is authorized to submit the database query to the responding computing device. The validation may be performed based on the one or more templates of database queries. The responding computing device may selectively enable the database query to be executed on the responding computing device or prevent the database query from being executed on the responding computing device.

20 Claims, 8 Drawing Sheets

(56) References Cited

U.S. PATENT DOCUMENTS

| | | | | |
|---|---|---|---|---|
| 11,537,734 | B2 | 12/2022 | Margel et al. | |
| 11,750,627 | B2 | 9/2023 | Shtar et al. | |
| 2017/0116426 | A1 * | 4/2017 | Pattabhiraman | H04L 63/102 |
| 2018/0054429 | A1 | 2/2018 | Donahue | |
| 2019/0213351 | A1 * | 7/2019 | Haila | G06F 21/6227 |
| 2021/0406386 | A1 * | 12/2021 | Ortiz | G06N 20/00 |
| 2024/0134852 | A1 * | 4/2024 | Zhong | G06F 21/6218 |

FOREIGN PATENT DOCUMENTS

| | | | | | |
|---|---|---|---|---|---|
| CN | 112580105 | B | | 3/2021 | |
| CN | 118395482 | A | * | 7/2024 | H04L 63/0428 |
| CN | 118468320 | B | * | 11/2024 | G06F 21/45 |
| WO | WO-2026064645 | A1 | * | 3/2026 | G06F 21/62 |

OTHER PUBLICATIONS

Scheepers, "How Attackers Compromise Azure Organizations through SaaS Apps," retrieved from https://pushsecurity.com/blog/how-attackers-compromise-azure-organizations-through-saas-apps/, 19 pages (2023).

Sundaram, "Azure AD Sign-in Log Monitoring," eG Innovations, retrieved from https://www.eginnovations.com/blog/active-directory-sign-in-logs/, 13 pages (2022).

* cited by examiner

SYSTEM AND METHOD FOR DETECTING AND PREVENTING ANOMALOUS BEHAVIOR OF NON-INTERACTIVE MACHINE TO MACHINE DATABASE ACCOUNTS

BACKGROUND

Database management systems may be used to store datasets that can be extracted through a database coding language called structured query language (SQL). Some data management systems may store large datasets and may be referred to as data warehouses. The datasets may be loaded into the data warehouses using processes (or jobs) that may be referred to as extract transform load (ETL) or extract load transform (ELT). The processes may be executed autonomously by a computing device that uses a non-interactive account.

SUMMARY

In some implementations, a method performed by a responding computing device includes receiving, from a querying computing device, a database query intended for the responding computing device, wherein the querying computing device generates and submits database queries autonomously as part of scheduled tasks or on behalf of an application; determining a role associated with the querying computing device and one or more templates of database queries associated with the querying computing device; performing a validation of the database query to determine whether the querying computing device is authorized to submit the database query to the responding computing device, wherein the validation is performed based on the role and the one or more templates of database queries; and selectively enabling the database query to be executed on the responding computing device or preventing the database query from being executed on the responding computing device, wherein the database query is enabled to be executed based on determining that the querying computing device is authorized to submit the database query, and wherein the database query is prevented from being executed based on determining that the querying computing device is not authorized to submit the database query.

In some implementations, a system includes a first computing device to: receive, from a second computing device, a database query intended for a first computing device, wherein the second computing device generates and submits database queries autonomously as part of scheduled tasks; determine one or more templates of database queries associated with the second computing device; perform a validation of the database query to determine whether the second computing device is authorized to submit the database query to the first computing device, wherein the validation is performed based on the one or more templates of database queries; and selectively enable the database query to be executed on the first computing device or prevent the database query from being executed on the first computing device, wherein the database query is enabled to be executed based on determining that the second computing device is authorized to submit the database query, and wherein the database query is prevented from being executed based on determining that the second computing device is not authorized to submit the database query.

In some implementations, a device includes one or more processors configured to: receive, from a second computing device, a database query intended for a first computing device, wherein the second computing device generates and submits database queries autonomously as part of scheduled tasks; determine one or more templates of database queries associated with the second computing device; perform a validation of the database query to determine whether the second computing device is unauthorized to submit a portion of the database query to the first computing device, wherein the validation is performed based on the one or more templates of database queries; and prevent the database query from being executed on the first computing device based on the second computing device being unauthorized to submit a portion of the database query to the first computing device.

DETAILED DESCRIPTION

Figure 1A:
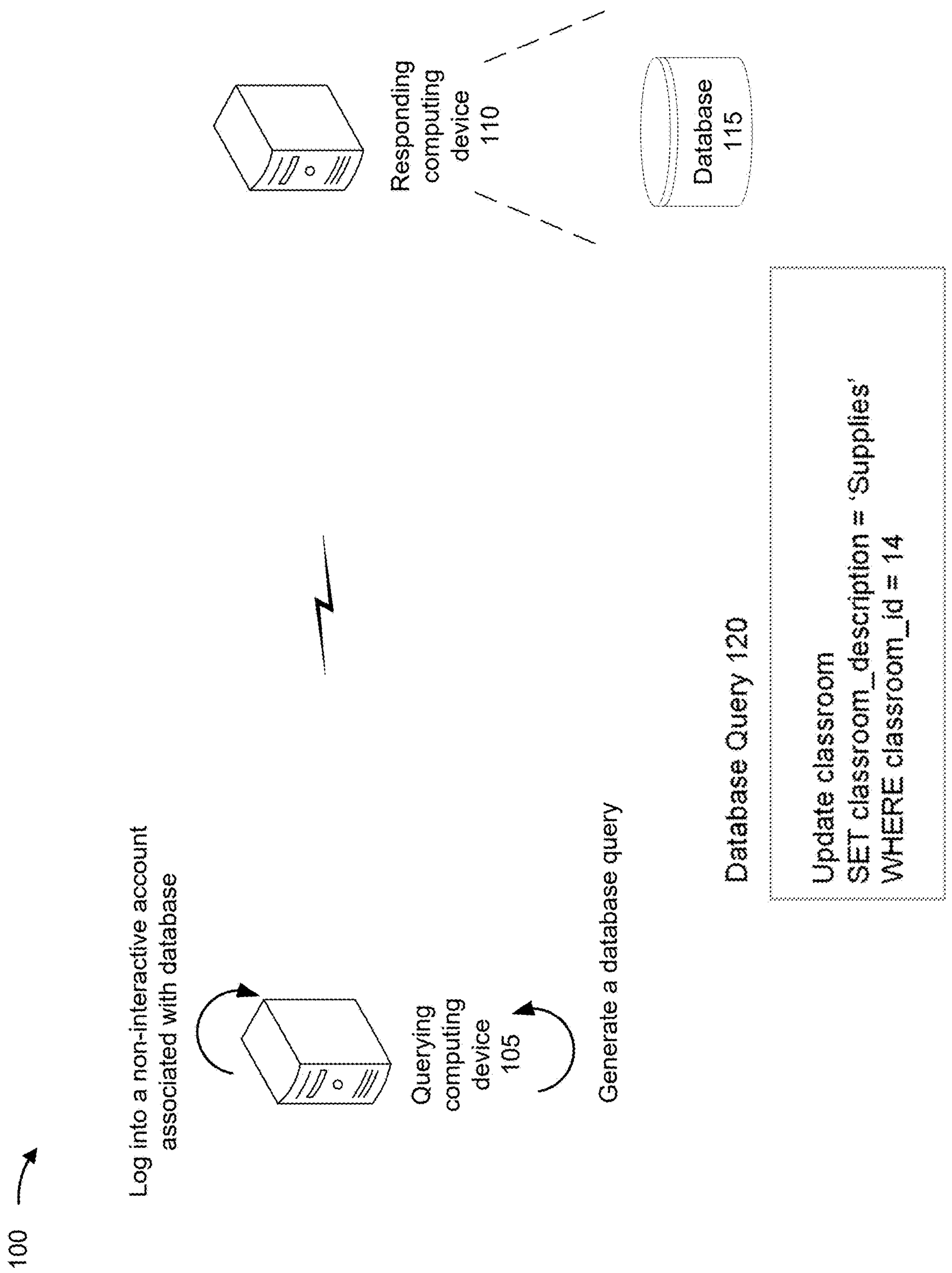
FIGS. 1A-1F are diagrams of an example implementation described herein.

The following detailed description of example implementations refers to the accompanying drawings. The same reference numbers in different drawings may identify the same or similar elements.

Datasets may be loaded into data warehouses using processes (or jobs) that may be referred to as extract transform load (ETL) or extract load transform (ELT). Typically, the processes may be executed autonomously by a computing device that uses a non-interactive account. The "non-interactive account" may refer to an account established for the computing device (or non-human account) that is used by the computing device to autonomously interact with the data warehouses. For example, the computing device may log in to the non-interactive account to access the data warehouses and to perform different operations on the data warehouses. The different operations may include loading the datasets into the data warehouses and retrieving the datasets from the data warehouses.

The non-interactive account may be used to execute repetitive SQL queries to perform repetitive operations (e.g., repetitive ETL operations and/or ELT operations). The repetitive operations may cause execution of activities that are nearly identical over time with the exception of changes in time-based or record-based parameters. The operations may become more defined (or narrower) as permissions, associated with the non-interactive account, become more restrictive.

Because of the repetitive operations performed using the non-interactive account and because the non-interactive account is used by the computing device and not by a human, the non-interactive account is typically not monitored. In some situations, the non-interactive account may be used to perform operations that are unauthorized for the non-interactive account. Such unauthorized operations may include accessing datasets (e.g., accessing one or more tables that the non-interactive account is unauthorized to access, inserting nefarious data into the one or more tables, and/or deleting the one or more tables, among other examples).

Because the non-interactive account is not monitored, the operations may be performed numerous times before being detected. The operations may compromise the data warehouses and/or computing devices that rely on the one or more tables. Accordingly, a need exists for a system to monitor non-interactive accounts to prevent unauthorized operations from being performed on databases.

Implementations described herein are directed to a technical solution that includes a system that detects anomalous behavior of non-interactive accounts in non-monitored environments (e.g., environments in which the non-interactive accounts are not monitored). For example, a first computing device may monitor operations performed by a second computing device on a database via a non-interactive account (e.g., monitor transactions with the database performed by the second computing device via the non-interactive account). The first computing device may host the database and may be a responding computing device. The database and/or the first computing device may be part of a data warehouse. The second computing device may be a querying computing device.

Based on monitoring, the first computing device may detect an anomalous behavior with respect to the non-interactive account and/or the second computing device. The anomalous behavior may be detected using a query based access control, a role based access control, and a query based anomaly detection. The query based access control may refer to determining whether a database query submitted by the second computing device matches one or more database query templates associated with the non-interactive account. The role based access control may refer to determining whether a role, associated with the non-interactive account, is authorized to access one or more tables of the database. The query based anomaly detection may refer to a combination of the query based access control and the role based access control.

In some implementations, the first computing device may catalogue templates (or patterns) of database queries for different non-interactive accounts and may use the templates as a basis for the query based access control. The first computing device may flag any non-interactive account with database queries that do not match corresponding templates. The templates (or patterns of database queries) may be determined based on historical database queries and/or may be registered with the first computing device. For example, the first computing device may be pre-configured with the templates (instead of dynamically determining the templates based on the historical database queries).

In some examples, a flagged non-interactive account may be suspended. For example, the flagged non-interactive account may be prevented from submitting a database query and/or a submitted database query may be prevented from being executed. Additionally, or alternatively, the flagged non-interactive account may be provided for further analysis (e.g., by an account specialist to resolve technical issues associated with the non-interactive account).

One advantage of implementations described herein is a detection (e.g., an early detection) and/or a prevention of unauthorized operations on the database. Current methods do not normalize on the fact that computing devices (e.g., machines) behave differently than humans. For example, a human may submit different types of database queries while a computing device is typically programmed to submit the same database query. Another advantage of implementations described herein is that the first computing device may detect a variation in a database query submitted by the second computing device (via the non-interactive account) may be an indication of an anomalous behavior of the computing device. As explained herein, the anomalous behavior may be an indicator of compromise for the data warehouse that is being accessed by the computing device without authorization.

FIGS. 1A-1F are diagrams of an example implementation 100 associated with detecting anomalous behavior of non-interactive accounts. As shown in FIGS. 1A-1F, example implementation 100 includes a querying computing device 105 and a responding computing device 110.

The devices of FIGS. 1A-1F may be connected via a network that includes one or more wired and/or wireless networks. As an example, the network may include Ethernet switches. Additionally, or alternatively, the network may include a cellular network, a public land mobile network (PLMN), a local area network (LAN), a wide area network (WAN), a private network, the Internet, and/or a combination of these or other types of networks. The network enables communication between querying computing device 105 and a responding computing device 110.

Querying computing device 105 may include one or more devices capable of receiving, generating, storing, processing, and/or providing information associated with detecting anomalous behavior of non-interactive accounts, as described elsewhere herein. For example, querying computing device 105 may generate and submit database queries to responding computing device 110 (e.g., to a database hosted by responding computing device 110). Querying computing device 105 may use a non-interactive account to submit the database queries, such as structured query language (SQL) queries. Querying computing device 105 may submit database queries to a single database, to multiple databases, or to copy the data from one database to another database.

Querying computing device 105 may include a communication device and/or a computing device. For example, querying computing device 105 may include a server, such as an application server, a client server, a web server, a database server, a host server, a proxy server, a virtual server (e.g., executing on computing hardware), or a server in a cloud computing system. In some implementations, querying computing device 105 includes computing hardware used in a cloud computing environment. In some implementations, querying computing device 105 may include a wireless communication device, a laptop computer, a desktop computer, a user equipment, a tablet computer, or a similar type of device.

Responding computing device 110 may include one or more devices capable of receiving, generating, storing, processing, and/or providing information associated with detecting anomalous behavior of non-interactive accounts, as described elsewhere herein. For example, responding computing device 110 may monitor database queries submitted by querying computing device 105 to detect an anomalous behavior of the non-interactive account and/or of querying computing device 105. In some situations, one or more devices other than responding computing device 110 may monitor the database queries.

Responding computing device 110 may include a communication device and/or a computing device. For example, responding computing device 110 may include a server, such as an application server, a client server, a web server, a database server, a host server, a proxy server, a virtual server (e.g., executing on computing hardware), or a server in a cloud computing system. In some implementations, responding computing device 110 includes computing hardware used in a cloud computing environment. In some implementations, responding computing device 110 may include a wireless communication device, a laptop computer, a mobile phone, a desktop computer, a user equipment, a tablet computer, or a similar type of device.

As shown in FIG. 1A, responding computing device 110 may include database 115. Database 115 may include one or more devices capable of receiving, generating, storing, processing, and/or providing information associated with detecting anomalous behavior of non-interactive accounts, as described elsewhere herein, as described elsewhere herein. For example, database 115 may store datasets that query computing device 105 attempts to access. In some examples, database 115 and/or responding computing device 110 may be part of a data warehouse.

Database 115 may include a database, a database server, a table, and/or a linked list. Database 115 may communicate with one or more other devices of an environment. In some situations, database 115 may be hosted by a device other than responding computing device 110. In some examples, data may be loaded into database 115 using templates. Additionally, or alternatively, the data may be loaded into database 115 without using templates.

In some implementations, the data stored by database 115 may be accessed using templatized database queries. The "templatized database queries" may refer to parameterized database queries that are scrubbed of inputs. In other words, the "templatized database queries" may refer to database queries that include parameters without including values for parameters that the parameters. In some implementations, the data may be accessed using injectable database queries (e.g., injection of raw database queries).

As shown in FIG. 1A, querying computing device 105 may log into a non-interactive account associated with database 115. In some implementations, querying computing device 105 may use a username and/or a password to log into the non-interactive account. Once querying computing device 105 has been authenticated using the username and/or the password, querying computing device 105 may perform operations on database 115 using the non-interactive account (e.g., using a user of the non-interactive account). In some situations, querying computing device 105 may log into the non-interactive account using secrets. The "secrets" may refer to values that are obtained at runtime and that may change. Such values are not hard coded.

The non-interactive account may be used to access database 115 (e.g., to access datasets stored by tables of database 115). For example, after querying computing device 105 has been authenticated, querying computing device 105 may establish a connection with database 115. For instance, querying computing device 105 may use connection information to establish the connection. The connection information may include a connection string to connect to querying computing device 105 to database 115*d* via responding computing device 110. The connection string may be a RESTful application programming interface (API) or maybe an open database connectivity (ODBC) string.

For instance, the non-interactive account may be used to submit database queries to database 115. In some implementations, querying computing device 105 may log into the non-interactive account as part of initiating a machine-to-machine process between querying computing device 105 and responding computing device 110. The machine-to-machine process may refer to querying computing device 105 submit a database query to responding computing device 110 to access a dataset. The machine-to-machine process may be triggered by a timer and/or by an event. For example, the machine-to-machine process may be performed periodically (e.g., daily, twice a week, weekly, among other examples).

In some implementations, once initiated, the machine-to-machine process may involve obtaining information that may be used as part of the process. For example, the machine-to-machine process may involve static files (e.g., with static or hard coded values) as well as values that may be determined at runtime.

As shown in FIG. 1A, after logging into the non-interactive account, querying computing device 105 may generate a database query 120. Querying computing device 105 may generate database query 120 as part of a routine autonomous operation performed by querying computing device 105. For example, querying computing device 105 may periodically (e.g., every hour, every day, every week, among other examples) log into the non-interactive account and generate database query 120. Additionally, or alternatively, querying computing device 105 may log into the non-interactive account and generate database query 120 after resuming operations following a power off condition.

As shown in FIG. 1A, querying computing device 105 may generate database query 120 to update a table of database 115. For example, the table may be named "classroom" and database query 120 may be to update a quantity of supplies for a classroom identified in the table with an identifier "14." In some examples, database query 120 may include a SQL query. Querying computing device 105 may submit database query 120 to responding computing device 110. Accordingly, database query 120 may be intended for responding computing device 110.

Figure 1B:
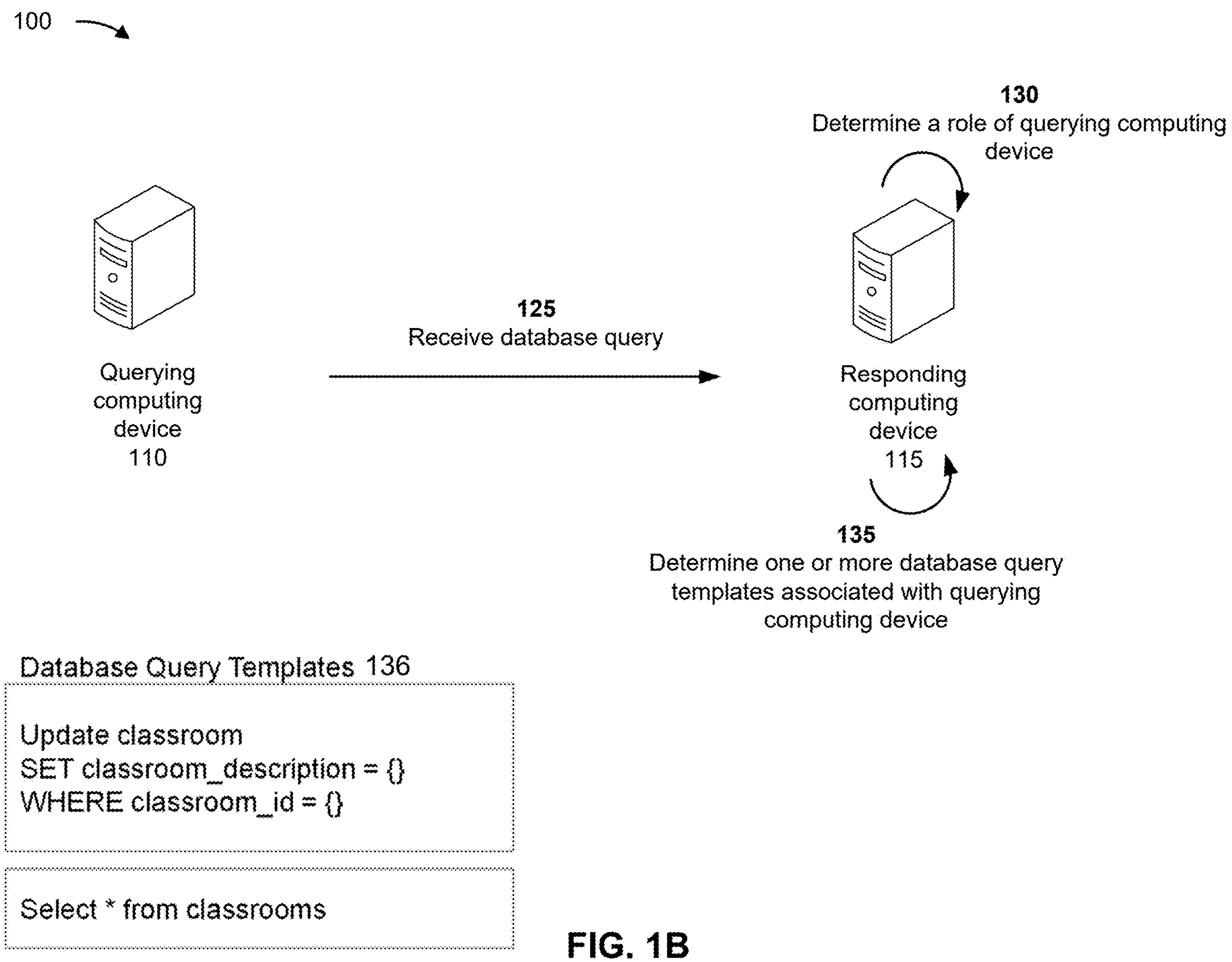

As shown in FIG. 1B, and by reference number 125, responding computing device 110 may receive database query 120. For example, responding computing device 110 may receive database query 120 from querying computing device 105. In some implementations, responding computing device 110 may receive information regarding querying computing device 105. The information may include information identifying querying computing device 105, such as a username associated with querying computing device 105, information identifying the non-interactive (e.g., network address of querying computing device 105, an Internet protocol (IP) address, a media access control address, among other examples of information that may be used to identify querying computing device 105 and/or identifying the non-interactive account.

As shown in FIG. 1B, and by reference number 130, responding computing device 110 may determine a role of querying computing device 105. For example, after receiving database query 120 from querying computing device 105, responding computing device 110 may determine a role associated with querying computing device 105 may receive database query 120 from querying computing device 105. In some implementations, responding computing device 110 may determine the role using the information regarding querying computing device 105. As an example, responding computing device 110 may perform a lookup of a data structure that stores information different roles in association with information regarding different non-interactive accounts (and/or different computing devices). For example, a first non-interactive account may be associated with a first role, a second non-interactive account may be associated with a second role, and so on.

Based on performing the lookup, responding computing device 110 may determine the role associated with querying computing device 105. For example, based on performing the lookup, responding computing device 110 may obtain role information regarding the role. The role information (regarding the role associated with querying computing device 105) may indicate formats of database queries that may be submitted using the non-interactive, a frequency for submitting the database queries (e.g., daily, twice weekly, weekly, among other examples), operations that may be performed using the database queries (e.g., update operations to update database 115, select operations to obtain data from database 115, and/or delete operations to delete data stored in database 115), one or more tables that may be accessed, among other examples. In some implementations, based on the role, responding computing device 110 may determine whether querying computing device 105 is authorized to submit database query 120.

As shown in FIG. 1B, and by reference number 135, responding computing device 110 may determine one or more database query templates associated with querying computing device 105. For example, after receiving database query 120 from querying computing device 105, responding computing device 110 may determine one or more database query templates associated with the non-interactive account for querying computing device 105. In some implementations, responding computing device 110 may determine the one or more database query templates using the information regarding querying computing device 105. As an example, responding computing device 110 may perform a lookup of a data structure that stores information different database query templates in association with information regarding different non-interactive accounts (and/or different computing devices). For example, a first non-interactive account may be associated with one or more first database query templates, a second non-interactive account may be associated with one or more second database query templates, and so on.

Based on performing the lookup, responding computing device 110 may determine database query templates 136 associated with the non-interactive account. As shown in FIG. 1B, database query templates 136 may indicate that querying computing device 105 is authorized to submit database queries to update the classroom table of database 115. As further shown in FIG. 1B, database query templates 136 may indicate that querying computing device 105 is authorized to submit database queries to obtain data from the classroom table. In some examples, database query templates 136 may identify one or more tables and one or more operations to be performed on the one or more tables without identifying parameters for the one or more operations. For example, database query templates 136 may not identify data that is used to update the one or more tables and/or may not identify a row and/or a column. In some implementations, based on one or more database query templates 136, responding computing device 110 may determine whether querying computing device 105 is authorized to submit database query 120.

In some implementations, responding computing device 110 may determine the one or more database query templates using information regarding the role. As an example, responding computing device 110 may perform a lookup of a data structure that stores information different database query templates in association with information regarding different roles. Based on performing the lookup, responding computing device 110 may determine database query templates 136 associated with the role. As shown in FIG. 1B, database query templates 136 may indicate that querying computing device 105 is authorized to submit database queries to update the classroom table of database 115. As further shown in FIG. 1B, database query templates 136 may indicate that querying computing device 105 is authorized to submit database queries to obtain data from the classroom table. After determining the role and/or determining database query templates 136, responding computing device 110 may perform a role based access control, a query based access control, and/or a query based anomaly detection to detect an anomaly behavior of responding computing device 110 and/or the non-interactive account with respect to database query 120. In some implementations, responding computing device 110 may use a role based access control to detect an anomaly behavior of responding computing device 110 and/or the non-interactive account, as described in FIG. 1C.

Figure 1C:
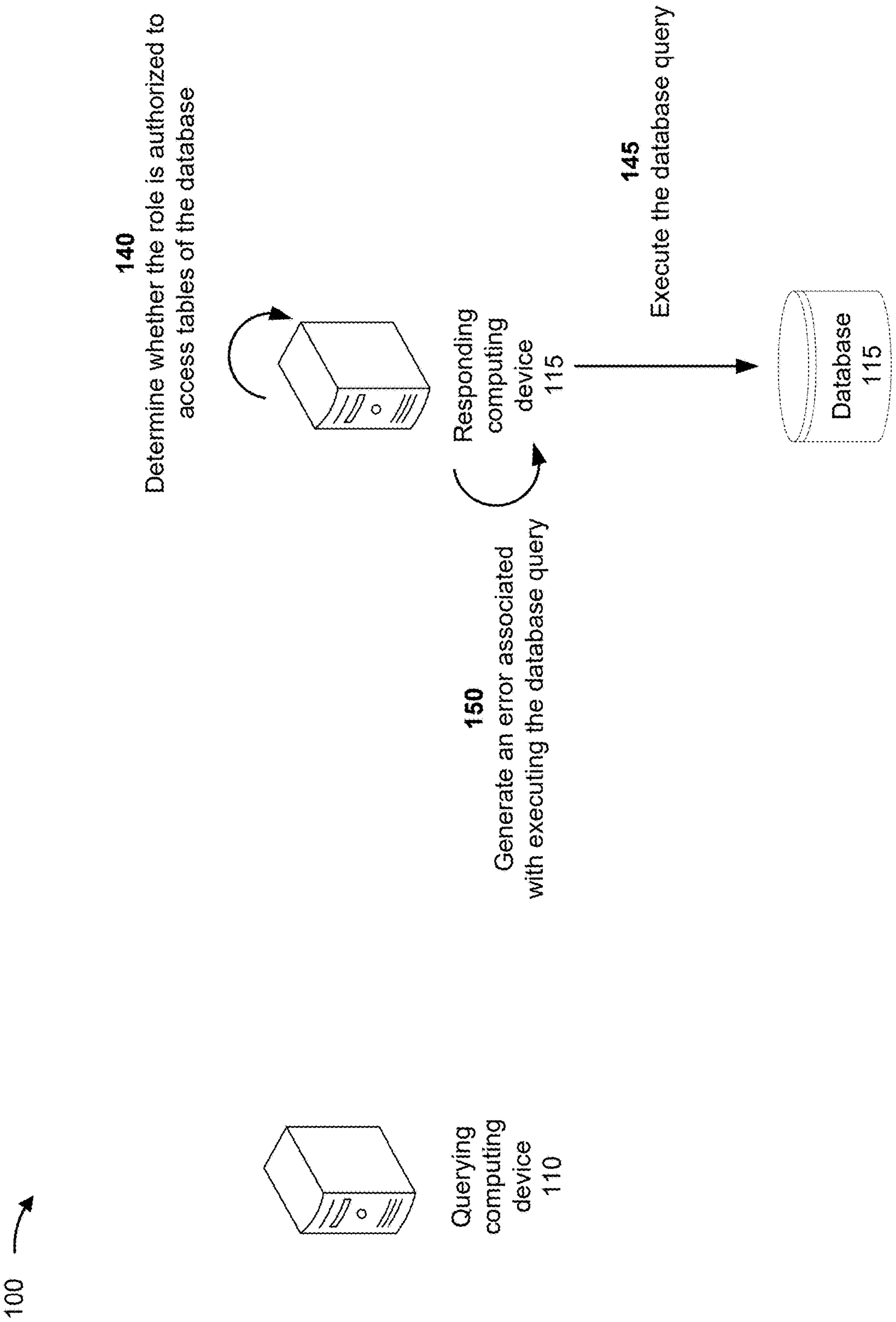

As shown in FIG. 1C, and by reference number 140, responding computing device 110 may determine whether the role is authorized to access tables of database 115. For example, after determining the role, responding computing device 110 may analyze the role information to determine whether the role authorizes the non-interactive account (and, accordingly, querying computing device 105) to access tables of database 115. For instance, the role information may identify one or more tables that the non-interactive account (and, accordingly, querying computing device 105) is authorized to access. Additionally, or alternatively, the role information may identify operations that the non-interactive account (and, accordingly, querying computing device 105) is authorized to perform on database 115.

As shown in FIG. 1C, and by reference number 145, responding computing device 110 may execute the database query. In some implementations, if the role information identifies tables of database 115 that are identified in database query 120 (e.g., if the role information identifies the classroom table), responding computing device 110 may execute database query 120. Additionally, or alternatively, if the role information identifies tables of database 115 that are identified in database query 120 (e.g., if the role information identifies the classroom table) and identifies a type of operation that is identified in database query 120 (e.g., an update operation), responding computing device 110 may execute database query 120.

As shown in FIG. 1C, and by reference number 150, responding computing device 110 may generate an error associated with executing the database query. In some implementations, if the role information does not identify the tables of database 115 that are identified in database query 120 (e.g., if the role information does not identify the classroom table), responding computing device 110 may prevent database query 120 from being executed and may generate an error (e.g., generate error information regarding the error). In some examples, the error information may include information indicating that database query 120 did not execute because the role is unauthorized to submit database query 120 (e.g., provided with insufficient permission to submit database query 120).

In some examples, the error information may include information indicating that database query 120 did not execute because the role is authorized to execute a first portion of database query 120 and is unauthorized to execute a second portion of database query 120. In some implementations, responding computing device 110 may provide the error information to querying computing device 105, may store the error information in a memory associated with responding computing device 110, may store the error information with information regarding the non-interactive account, may provide the error information to a device of an administrator of querying computing device 105, may provide the error information to a device of an administrator of responding computing device 110, among other examples.

Figure 1D:
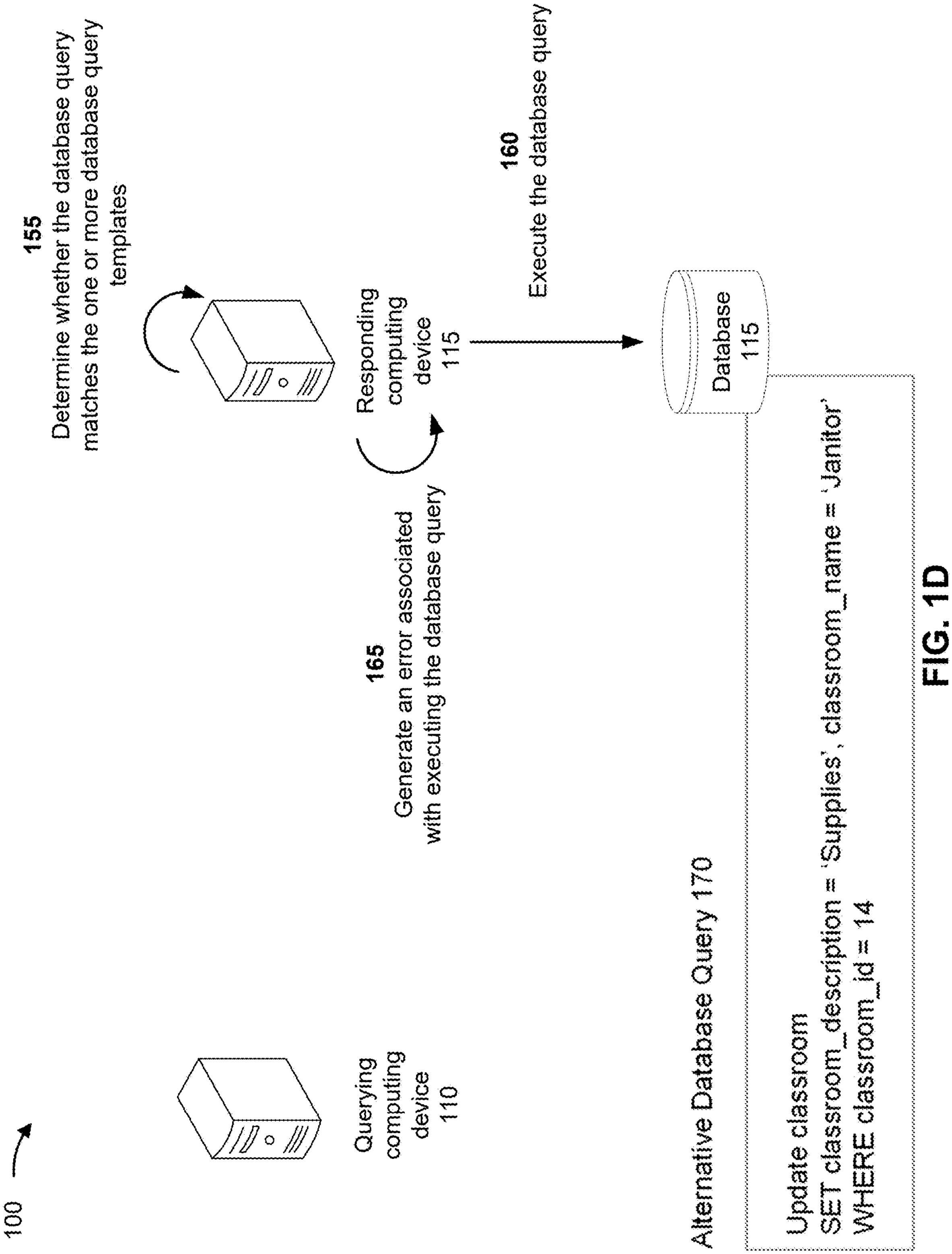

In some implementations, responding computing device 110 may use a query based access control to detect an anomaly behavior of responding computing device 110 and/or the non-interactive account, as described in FIG. 1D. As shown in FIG. 1D, and by reference number 155, responding computing device 110 may determine whether database query 120 matches database query templates 136. For example, after determining database query templates 136, responding computing device 110 may compare database query 120 and database query templates 136. In some implementations, responding computing device 110 may determine whether one or more operations identified by database query 120 match one or more operations identified by database query templates 136. Additionally, or alternatively, responding computing device 110 may determine whether one or more tables identified by database query 120 match one or more tables identified by database query templates 136.

In some implementations, responding computing device 110 may use one or more string similarity algorithms (or string comparison algorithms). The one or more string similarity algorithms may include an n-gram comparison algorithm, a Knuth-Pratt-Morris algorithm, a Rabin-Karp algorithm, among other examples. In some implementations, responding computing device 110 may use one or more natural language processing algorithms to compare database query 120 and database query templates 136. For example, edit based algorithms, token based algorithms, sequence based algorithms, a Levenshtein distance algorithm, among others examples.

As shown in FIG. 1D, and by reference number 160, responding computing device 110 may execute the database query. In some implementations, if the one or more operations identified by database query 120 match the one or more operations identified by database query templates 136, responding computing device 110 may execute database query 120. Additionally, or alternatively, if the one or more tables identified by database query 120 match the one or more tables identified by database query templates 136, responding computing device 110 may execute database query 120.

As shown in FIG. 1D, and by reference number 165, responding computing device 110 may generate an error associated with executing the database query. In some implementations, if database query 120 does not match database query templates 136, responding computing device 110 may prevent database query 120 from being executed and may generate an error (e.g., generate error information regarding the error). For example, responding computing device 110 may prevent database query 120 from being executed and may generate the error if the one or more tables identified by database query 120 do not match the one or more tables identified by database query templates 136. Additionally, or alternatively, responding computing device 110 may prevent database query 120 from being executed and may generate the error if the one or more operations identified by database query 120 do not match the one or more operations identified by database query templates 136.

As shown for example in FIG. 1D, if querying computing device 105 were to submit alternative database query 170, responding computing device 110 may determine that a first portion of alternative database query 170 matches database query templates 136 and that a second portion of alternative database query 170 does not match database query templates 136. For example, responding computing device 110 may determine that the second portion of alternative database query 170 ("classroom_name='Janitor'") does not match database query templates 136. In this regard, responding computing device 110 may determine that the second portion of alternative database query 170 is an attempt to perform an operation on the classroom table that is unauthorized.

Based on determining that the second portion of alternative database query 170 does not match database query templates 136, responding computing device 110 may generate the error. Responding computing device 110 may generate the error in a manner similar to the manner described above in connection with FIG. 1C. Additionally, or alternatively, responding computing device 110 may provide the error in a manner similar to the manner described above in connection with FIG. 1C.

Figure 1E:
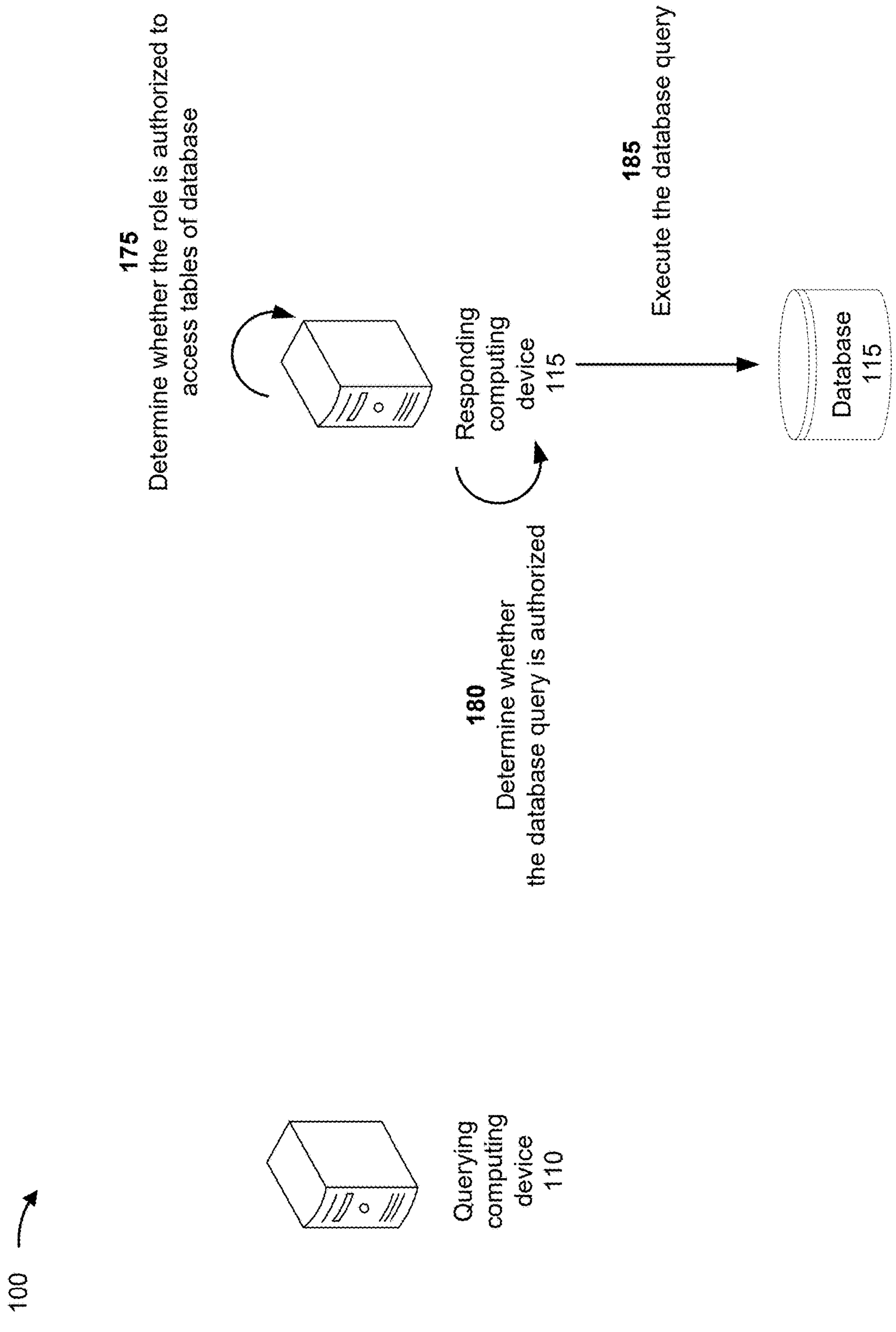

In some implementations, responding computing device 110 may use a query based anomaly detection to detect an anomaly behavior of responding computing device 110 and/or the non-interactive account, as described in FIG. 1E. As shown in FIG. 1E, and by reference number 175, responding computing device 110 may determine whether the role is authorized to access tables of database 115. For example, after determining the role, responding computing device 110 may analyze the role information to determine whether the role authorizes the non-interactive account (and, accordingly, querying computing device 105) to submit database query 120 in a manner similar to the manner described above in connection with FIG. 1C. If responding computing device 110 determines that the role does not authorize the non-interactive account (and, accordingly, querying computing device 105) to submit database queries to access the table identified by database query 120, responding computing device 110 may generate an error in a manner similar to the manner described above in connection with FIG. 1C.

As shown in FIG. 1E, and by reference number 180, responding computing device 110 may determine whether the database query is authorized. For example, if responding computing device 110 determines that the role authorizes to submit database queries to access the table, responding computing device 110 may determine whether the non-interactive account is authorized to submit database query 120 to perform the operations on the table of database 115. In other words, responding computing device 110 may determine whether the non-interactive account is authorized to perform the operations on the table of database 115. In some implementations, responding computing device 110 may compare database query 120 and database query templates 136 to determine whether the non-interactive account is authorized to execute database query 120 to perform the operations on the table of database 115, in a manner similar to the manner described above in connection with FIG. 1D. If responding computing device 110 determines that the non-interactive account is unauthorized to perform the operations on the table of database 115, responding computing device 110 may generate an error in a manner similar to the manner described above in connection with FIG. 1C.

Figure 1F:
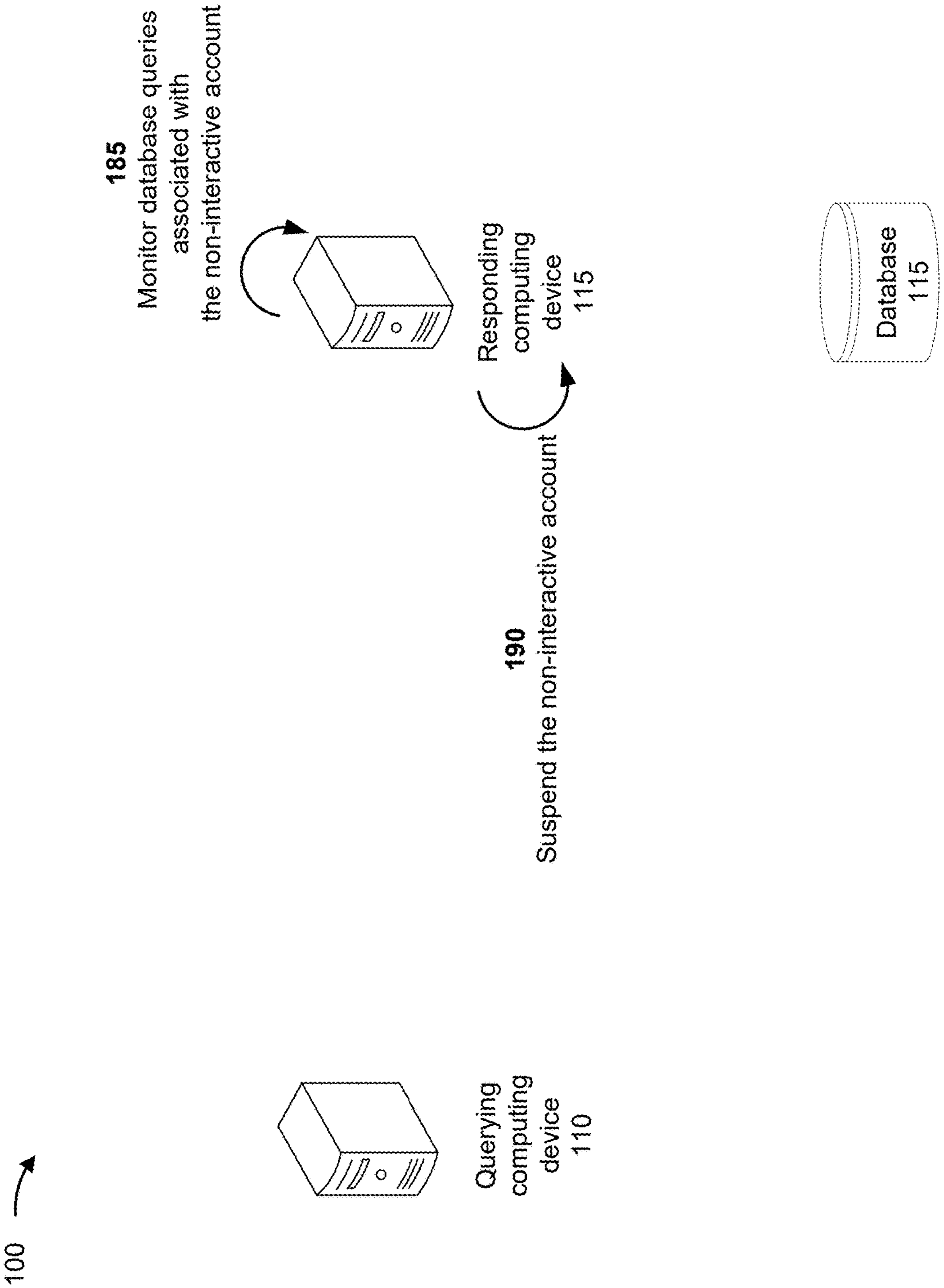

As shown in FIG. 1F, and by reference number 185, responding computing device 110 may monitor database queries associated with the non-interactive account. For example, if responding computing device 110 determines that the non-interactive account is unauthorized to perform the operations on the table of database 115, responding computing device 110 may monitor database queries submitted using the non-interactive account. In this regard, prior to determining that the non-interactive account is unauthorized to perform the operations on the table of database 115, the non-interactive account may be an unmonitored account.

As shown in FIG. 1F, and by reference number 190, responding computing device 110 may suspend the non-interactive account. For example, if responding computing device 110 determines that the non-interactive account is unauthorized to perform the operations on the table of database 115, responding computing device 110 may suspend the non-interactive account. For example, responding computing device 110 may reject database queries submitted by querying computing device 105. Additionally, or alternatively, responding computing device 110 may prevent querying computing device 105 from submitting database queries. For example, responding computing device 110 (and/or another device included in the network of querying computing device 105) may transmit instructions to querying computing device 105 that causes querying computing device 105 to stop submitting database queries (e.g., to responding computing device 110).

Implementations described herein are directed to a method for detecting anomalous behavior in non-interactive machine to machine database accounts by fingerprinting the database queries that are run and determining when it varies from its repeatable pattern. For example, implementations described herein are directed to detecting anomalous non-interactive account behavior in non-monitored environments as a form of query based access control.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
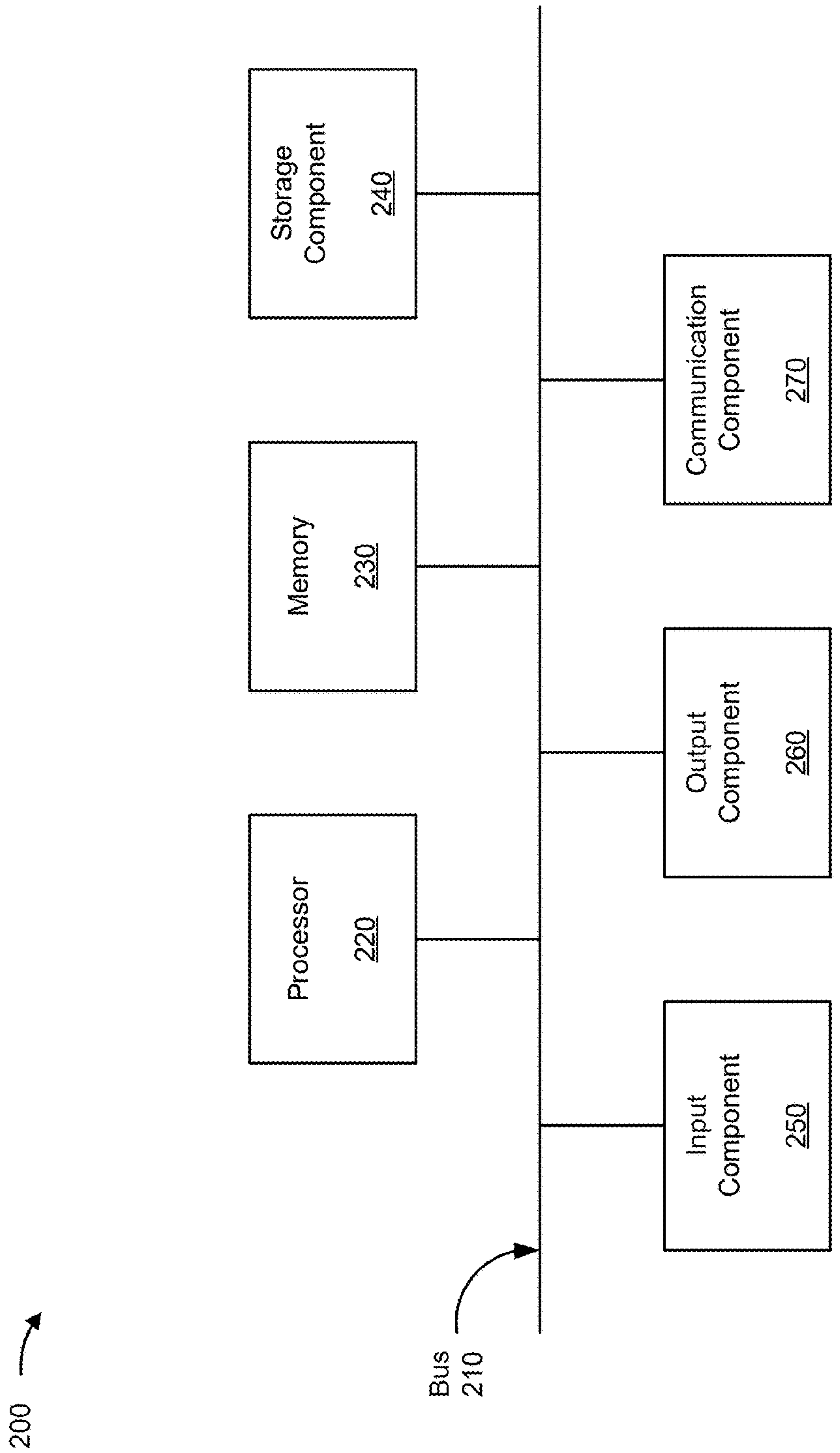
FIG. 2 is a diagram of example components of one or more devices of FIG. 1.

FIG. 2 is a diagram of example components of a device 200, which may correspond to querying computing device 105 and/or responding computing device 110. In some implementations, querying computing device 105 and/or responding computing device 110 may include one or more devices 200 and/or one or more components of device 200. As shown in FIG. 2, device 200 may include a bus 210, a processor 220, a memory 230, a storage component 240, an input component 250, an output component 260, and a communication component 270.

Bus 210 includes a component that enables wired and/or wireless communication among the components of device 200. Processor 220 includes a central processing unit, a graphics processing unit, a microprocessor, a controller, a microcontroller, a digital signal processor, a field-programmable gate array, an application-specific integrated circuit, and/or another type of processing component. Processor 220 is implemented in hardware, firmware, or a combination of hardware and software. In some implementations, processor 220 includes one or more processors capable of being programmed to perform a function. Memory 230 includes a random access memory, a read only memory, and/or another type of memory (e.g., a flash memory, a magnetic memory, and/or an optical memory).

Storage component 240 stores information and/or software related to the operation of device 200. For example, storage component 240 may include a hard disk drive, a magnetic disk drive, an optical disk drive, a solid state disk drive, a compact disc, a digital versatile disc, and/or another type of non-transitory computer-readable medium. Input component 250 enables device 200 to receive input, such as user input and/or sensed inputs. For example, input component 250 may include a touch screen, a keyboard, a keypad, a mouse, a button, a microphone, a switch, a sensor, a global positioning system component, an accelerometer, a gyroscope, and/or an actuator. Output component 260 enables device 200 to provide output, such as via a display, a speaker, and/or one or more light-emitting diodes. Communication component 270 enables device 200 to communicate with other devices, such as via a wired connection and/or a wireless connection. For example, communication component 270 may include a receiver, a transmitter, a transceiver, a modem, a network interface card, and/or an antenna.

Device 200 may perform one or more processes described herein. For example, a non-transitory computer-readable medium (e.g., memory 230 and/or storage component 240) may store a set of instructions (e.g., one or more instructions, code, software code, and/or program code) for execution by processor 220. Processor 220 may execute the set of instructions to perform one or more processes described herein. In some implementations, execution of the set of instructions, by one or more processors 220, causes the one or more processors 220 and/or the device 200 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 2 are provided as an example. Device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3:
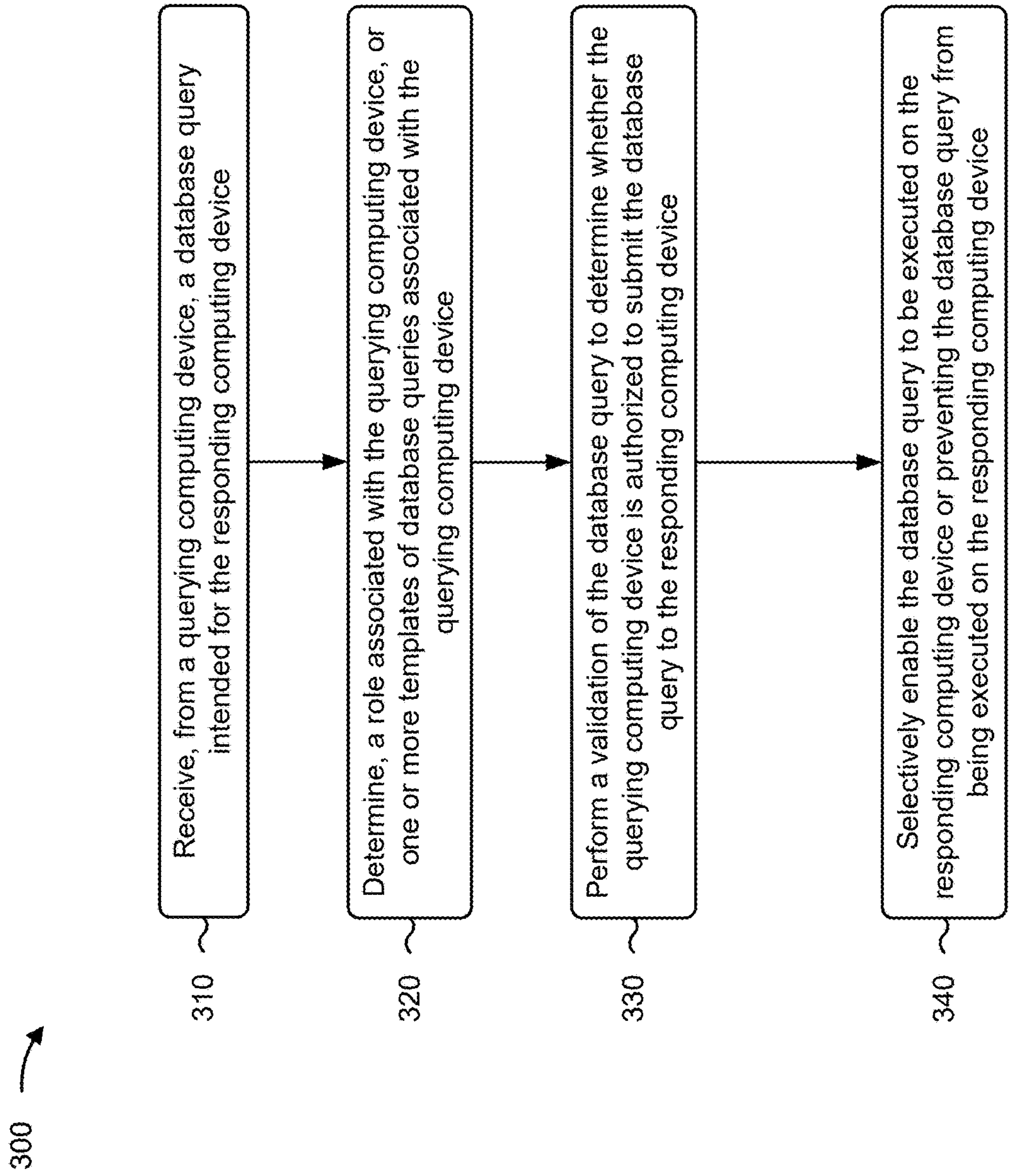
FIG. 3 is a flowchart of an example process relating to detecting and preventing anomalous behavior of non-interactive machine to machine database accounts.

FIG. 3 is a flowchart of an example process 300 associated with detecting and preventing anomalous behavior of non-interactive machine to machine database accounts. In some implementations, one or more process blocks of FIG. 3 may be performed by a responding computing device (e.g., responding computing device 110). In some implementations, one or more process blocks of FIG. 3 may be performed by another device or a group of devices separate from or including the responding computing device, such as a second computing device (e.g., querying computing device 105). Additionally, or alternatively, one or more process blocks of FIG. 3 may be performed by one or more components of device 200, such as processor 220, memory 230, storage component 240, input component 250, output component 260, and/or communication interface 270.

As shown in FIG. 3, process 300 may include receiving, from a querying computing device, a database query intended for a responding computing device (block 310). For example, the responding computing device may receive, from a querying computing device, a database query intended for a responding computing device, as described above. In some implementations, the querying computing device generates and submits database queries autonomously as part of scheduled tasks or on behalf of an application.

As further shown in FIG. 3, process 300 may include determining a role associated with the querying computing device and one or more templates of database queries associated with the querying computing device (block 320). For example, the responding computing device may determine a role associated with the querying computing device, or one or more templates of database queries associated with the querying computing device, as described above. In some implementations, the one or more templates of the database queries identify a list of database queries that the querying computing device is authorized to submit to the responding computing device.

As further shown in FIG. 3, process 300 may include performing a validation of the database query to determine whether the querying computing device is authorized to submit the database query to the responding computing device (block 330). For example, the responding computing device may perform a validation of the database query to determine whether the querying computing device is authorized to submit the database query to the responding computing device, as described above. In some implementations, the validation is performed based on the role and the one or more templates of database queries.

In some implementations, performing the validation of the database query comprises determining that the role of the querying computing device does not authorize the querying computing device to submit the database query to the responding computing device, and preventing the database query from being executed on the responding computing device based on determining that the role of the querying computing device does not authorize the querying computing device to submit the database query.

In some implementations, performing the validation of the database query comprises determining that the role of the first computing authorizes the querying computing device to submit a first portion of the database query to the responding computing device, determining that the role of the first computing does not authorize the querying computing device to submit a second portion of the database query to the responding computing device, and preventing the database query from being executed on the responding computing device based on determining that the role of the first computing does not authorize the querying computing device to submit a second portion of the database query.

In some implementations, performing the validation of the database query comprises comparing the database query and the one or more templates of the database queries, and preventing the database query from being executed on the responding computing device based on comparing the database query and the one or more templates of the database queries.

In some implementations, performing the validation of the database query comprises determining that a first portion of the database query matches the one or more templates of the database queries, determining that a second portion of the database query does not match the one or more templates of the database queries, and preventing the database query from being executed on the responding computing device based on determining that the second portion of the database query does not match the one or more templates of the database queries.

In some implementations, performing the validation of the database query comprises determining that the role of the first computing authorizes the querying computing device to submit the database query to the responding computing device, and comparing the database query and the one or more templates of the database queries after determining that the role of the first computing authorizes the querying computing device to submit the database query to the responding computing device.

As further shown in FIG. 3, process 300 may include selectively enabling the database query to be executed on the responding computing device or preventing the database query from being executed on the responding computing device, wherein the database query is enabled to be executed based on determining that the querying computing device is authorized to submit the database query, and wherein the database query is prevented from being executed based on determining that the querying computing device is not authorized to submit the database query (block 340). For example, the responding computing device may selectively enable the database query to be executed on the responding computing device or prevent the database query from being executed on the responding computing device, as described above. In some implementations, the database query is enabled to be executed based on determining that the querying computing device is authorized to submit the database query. In some implementations, the database query is prevented from being executed based on determining that the querying computing device is not authorized to submit the database query.

In some implementations, process 300 may include determining that the querying computing device is unauthorized to submit the database query; and at least one of: suspend an account associated with the querying computing device, or cause database queries associated with the account to be monitored. For example, the database queries may be investigated to determine whether the database queries are authorized.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, satisfying a threshold may, depending on the context, refer to a value being greater than the threshold, greater than or equal to the threshold, less than the threshold, less than or equal to the threshold, equal to the threshold, not equal to the threshold, or the like.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method performed by a responding computing device, the method comprising:

receiving, from a querying computing device, a database query intended for the responding computing device,
  wherein the querying computing device generates and submits database queries autonomously as part of scheduled tasks;

determining:
  a role associated with the querying computing device; and
  one or more templates of database queries associated with the querying computing device;

performing a validation of the database query to determine whether the querying computing device is authorized to submit the database query to the responding computing device,
  wherein the validation is performed based on the role and whether the database query matches the one or more templates of the database queries; and selectively enabling the database query to be executed on the responding computing device or preventing the database query from being executed on the responding computing device,
  wherein the database query is enabled to be executed based on determining, based on performing the validation, that the querying computing device is authorized to submit the database query, and
  wherein the database query is prevented from being executed based on determining, based on performing the validation, that the querying computing device is not authorized to submit the database query.

2. The method of claim 1, further comprising:

determining that the querying computing device is unauthorized to submit the database query to the responding computing device; and preventing the database query from being executed on the responding computing device based on determining that the querying computing device is unauthorized to submit the database query.

3. The method of claim 2, further comprising at least one of:

suspending an account associated with the querying computing device; or causing database queries associated with the account to be monitored.

4. The method of claim 1, wherein performing the validation of the database query comprises:

comparing the database query and the one or more templates of the database queries.

5. The method of claim 4, wherein performing the validation of the database query comprises:

determining that a first portion of the database query matches the one or more templates of the database queries;

determining that a second portion of the database query does not match the one or more templates of the database queries.

6. The method of claim 1, wherein the one or more templates of the database queries identify a list of database queries that the querying computing device is authorized to submit to the responding computing device.

7. The method of claim 1, wherein performing the validation of the database query comprises:

determining that the role of the querying computing device authorizes the querying computing device to submit the database query to the responding computing device; and comparing the database query and the one or more templates of the database queries after determining that the role of the querying computing device authorizes the querying computing device to submit the database query to the responding computing device.

8. A first computing device, comprising:

one or more processors; and a non-transitory computer-readable memory storing executable instructions that, when executed by the one or more processors, cause the first computing device to:
  receive, from a second computing device, a database query intended for the first computing device,
    wherein the second computing device generates and submits database queries autonomously as part of scheduled tasks;
  determine one or more templates of database queries associated with the second computing device;
  perform a validation of the database query to determine whether the second computing device is authorized to submit the database query to the first computing device,
    wherein the validation is performed based on whether the database query matches the one or more templates of the database queries; and
  selectively enable the database query to be executed on the first computing device or prevent the database query from being executed on the first computing device,
    wherein the database query is enabled to be executed based on determining, based on performing the validation, that the second computing device is authorized to submit the database query, and
    wherein the database query is prevented from being executed based on determining, based on performing the validation, that the second computing device is not authorized to submit the database query.

9. The first computing device of claim 8, wherein the first computing device is to:

determine that the second computing device is unauthorized to submit the database query; and suspend an account associated with the second computing device.

10. The first computing device of claim 8, wherein the first computing device is to:

determine that the second computing device is unauthorized to submit the database query; and cause database queries associated with an account, associated with the second computing device, to be monitored.

11. The first computing device of claim 8, wherein, to perform the validation of the database query, the first computing device is to:

determine that a role of the second computing device authorizes the second computing device to submit the database query to the first computing device; and compare the database query and the one or more templates of the database queries after determining that the role of the second computing device authorizes the second computing device to submit the database query to the first computing device.

12. The first computing device of claim 11, wherein the first computing device is to:

determine the role of the second computing device by performing a lookup of a data structure storing role information associated with the second computing device.

13. The first computing device of claim 8, wherein the first computing device is to:

determine that a role of the second computing device authorizes the second computing device to submit a first portion of the database query to the first computing device;

determine that the role of the second computing device does not authorize the second computing device to submit a second portion of the database query to the first computing device; and prevent the database query from being executed on the first computing device based on determining that the role of the second computing device does not authorize the second computing device to submit the second portion of the database query.

14. The first computing device of claim 8, wherein the first computing device is to:

determine that a first portion of the database query matches the one or more templates of the database queries;

determine that a second portion of the database query does not match the one or more templates of the database queries; and prevent the database query from being executed on the first computing device based on determining that the second portion of the database query does not match the one or more templates of the database queries.

15. A device, comprising:

one or more processors; and a non-transitory computer-readable memory storing executable instructions that, when executed by the one or more processors, cause the device to:

receive, from a second computing device, a database query intended for a first computing device, wherein the second computing device generates and submits database queries autonomously as part of scheduled tasks;

determine one or more templates of database queries associated with the second computing device;

perform a validation of the database query to determine whether the second computing device is authorized to submit the database query to the first computing device, wherein the validation is performed based on whether portions of the database query match the one or more templates of the database queries;

enable the database query to be executed on the first computing device based on the validation; and prevent the database query from being executed on the first computing device based on the second computing device not being authorized to submit a first portion of the portions of the database query to the first computing device.

16. The device of claim 15, wherein, to perform the validation of the database query, execution of the executable instructions by the one or more processors further causes the device to:

determine that a role of the second computing device authorizes the second computing device to submit a second portion of the database query to the first computing device; and determine that the role of the second computing device does not authorize the second computing device to submit the first portion of the database query to the first computing device.

17. The device of claim 15, wherein based on the second computing device not being authorized to submit the first portion, execution of the executable instructions by the one or more processors further causes the device to:

suspend an account associated with the second computing device; or cause database queries associated with the account to be monitored.

18. The device of claim 15, wherein the one or more templates of the database queries identify a list of database queries that the second computing device is authorized to submit to the first computing device.

19. The device of claim 15, wherein, to perform the validation of the database query, execution of the executable instructions by the one or more processors further cause the device to:

determine that a role of the second computing device authorizes the second computing device to submit the database query to the first computing device;

compare the first portion and the one or more templates of the database queries after determining that the role of the second computing device authorizes the second computing device to submit the database query to the first computing device; and determine that the second computing device is not authorized to submit the database query to the first computing device based on comparing the first portion and the one or more templates of the database queries.

20. The device of claim 18, wherein execution of the executable instructions by the one or more processors further cause the device to:

determine that the first portion does not match the one or more templates of the database queries; and prevent the database query from being executed on the first computing device based on determining that the first portion of the database query does not match the one or more templates of the database queries.

* * * * *